US011870080B2

(12) United States Patent
Fukuyama et al.

(10) Patent No.: US 11,870,080 B2
(45) Date of Patent: Jan. 9, 2024

(54) ANODE LAYER ACTIVATION METHOD FOR SOLID OXIDE FUEL CELL, AND SOLID OXIDE FUEL CELL SYSTEM

(71) Applicant: Nissan Motor Co., Ltd., Yokohama (JP)

(72) Inventors: Yosuke Fukuyama, Kanagawa (JP); Mari Kawabuchi, Kanagawa (JP); Kazuyuki Sato, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 80 days.

(21) Appl. No.: 16/960,942

(22) PCT Filed: Feb. 9, 2018

(86) PCT No.: PCT/JP2018/004632
§ 371 (c)(1),
(2) Date: Jul. 9, 2020

(87) PCT Pub. No.: WO2019/155610
PCT Pub. Date: Aug. 15, 2019

(65) Prior Publication Data
US 2020/0343561 A1    Oct. 29, 2020

(51) Int. Cl.
*H01M 8/04225*    (2016.01)
*H01M 4/90*    (2006.01)
(Continued)

(52) U.S. Cl.
CPC ......... *H01M 4/905* (2013.01); *H01M 4/8668* (2013.01); *H01M 8/04225* (2016.02); *H01M 8/1286* (2013.01)

(58) Field of Classification Search
CPC .................. H01M 8/04225; H01M 4/905
See application file for complete search history.

(56) References Cited

U.S. PATENT DOCUMENTS 9,040,207 B2    5/2015  Prenninger et al.
10,096,840 B1 *  10/2018 Venkataraman .. H01M 8/04228
(Continued)

FOREIGN PATENT DOCUMENTS

| JP | 2011-96432 A | 5/2011 |
| JP | 2012-533162 A | 12/2012 |
| JP | 2013-206684 A | 10/2013 |

OTHER PUBLICATIONS

Waldbillig et al. Enhancing the Redox Tolerance of Anode-Supported SOFC by Microstructural Modification, Journal of the Electrochemical Society. 154, (2) B133-B138 (2007). (Year: 2007).*
(Continued)

*Primary Examiner* — Lucas J. O'Donnell
(74) *Attorney, Agent, or Firm* — Global IP Counselors, LLP

(57) ABSTRACT

A solid oxide fuel cell includes a metal support cell, in which an anode layer containing nickel, an electrolyte layer and a cathode layer are stacked on a metal support portion. In the method for activating the anode layer in the solid oxide fuel cell, first, an oxygen-containing gas is introduced into the anode layer to oxidize the nickel. Next, a hydrogen-containing gas HG is introduced into the anode layer to reduce the nickel oxide formed by oxidizing the nickel, and to increase conduction paths of the nickel that electrically connect the electrolyte layer to the metal support part in the anode layer.

23 Claims, 13 Drawing Sheets

(51) Int. Cl.
  *H01M 4/86* (2006.01)
  *H01M 8/1286* (2016.01)

(56) References Cited

U.S. PATENT DOCUMENTS

| | | | |
|---|---|---|---|
| 2001/0012576 A1* | 8/2001 | Christiansen | H01M 8/0625 |
| | | | 429/495 |
| 2003/0134171 A1* | 7/2003 | Sarkar | C25D 13/02 |
| | | | 429/466 |
| 2006/0141300 A1 | 6/2006 | Wood et al. | |
| 2009/0136812 A1 | 5/2009 | Yonesato et al. | |
| 2014/0329159 A1* | 11/2014 | Ibuka | H01M 8/0606 |
| | | | 429/423 |

OTHER PUBLICATIONS

Bin Liu, Yun Zhang, Baofeng Tu, Yonglai Dong, Mojie Cheng, Electrochemical impedance investigation of the redox behaviour of a Ni-YSZ anode, Journal of Power Sources, vol. 165, Issue 1, 2007, pp. 114-119. (Year: 2007).*
Sukino et al., Effect of Redox Cycling on Mechanical Properties of Ni-YSZ Cermets for SOFC Anodes; ECS Transactions, 35 (1) 147301482 (2011). (Year: 2011).*
Antonin Faes et al., "A Review of RedOx Cycling of Solid Oxide Fuel Cells Anode", Membranes, Aug. 31, 2012, p. 585-664, vol. 2, MDPI, Switzerland.
M. Pihlatie et al., "Testing and Improving the redox stability of Ni-based oxide fuel cells", Journal of Power Sources, Dec. 13, 2008, p. 322-330, vol. 193, Elsevier, Amsterdam.

* cited by examiner

ANODE LAYER ACTIVATION METHOD FOR SOLID OXIDE FUEL CELL, AND SOLID OXIDE FUEL CELL SYSTEM

This application is a U.S. national stage application of International Application No. PCT/JP2018/004632, filed on Feb. 9, 2018.

BACKGROUND

Technical Field

The present invention relates to a method for activating an anode layer in a solid oxide fuel cell, and a solid oxide fuel cell system.

Background Information

Solid oxide fuel cells (SOFC), (hereinafter sometimes simply referred to as "SOFC") have high thermal efficiency, are capable of electrochemically reacting fuel and air without using a noble metal catalyst, and can use numerous types of fuels. Although SOFC have such advantages, power generation performance is low at the start of power generation and a 100% characteristic cannot be exhibited; or, if operated over a long period of time under a constant load current a gradual decrease in voltage is exhibited. The voltage drop of SOFC is known to be caused by a decrease in catalyst activity of an anode layer.

An electrode activation method for an SOFC disclosed in Japanese Laid-Open Patent Application No. 2013-206684 (Patent Document 1) is known as an electrode activation method that activates the anode layer in the SOFC. According to this electrode activation method, when output voltage decreases, first, the anode layer is placed in an inert gas atmosphere and the cathode layer is placed in an oxygen gas-containing atmosphere. A pulse voltage is then applied between the anode layer and the cathode layer.

SUMMARY

SOFCs include metal support cell type SOFCs, which have a structure in which a power generation cell (stacked anode layer, electrolyte layer, and cathode layer body) is supported by a metal support part. The metal support part is formed of a porous metal having gas permeability and electrical conductivity. A metal support cell has better mechanical strength than electrolyte-supported cells and electrode-supported cells. As a result, it is possible to thin the electrolyte layer and reduce electric resistance, to thereby improve power generation efficiency.

The electrode activation method disclosed in Patent Document 1 can be applied to a metal support cell type SOFC, but does not make sufficient use of the characteristic excellent mechanical strength of metal support cells.

An object of the present invention is to provide an anode layer activation method suitable for application to a metal support cell type solid oxide fuel cell, and a solid oxide fuel cell system.

A method for activating an anode layer in a solid oxide fuel cell according to the present invention, which achieves the object described above, is an anode layer activation method in a solid oxide fuel cell having a metal support cell in which an anode layer containing nickel, an electrolyte layer and a cathode layer are stacked on a metal support part. In the anode layer activation method, first, an oxygen-containing gas is introduced into the anode layer to oxidize the nickel. Next, a hydrogen-containing gas is introduced into the anode layer to reduce the oxidized nickel.

A solid oxide fuel cell system according to the present invention, which achieves the object described above, includes a solid oxide fuel cell having a metal support cell, in which an anode layer containing nickel, an electrolyte layer and a cathode layer are stacked on a metal support part. The solid oxide fuel cell system further includes a fuel introduction unit that introduces a hydrogen-containing gas into the anode layer, an oxidation processing unit that introduces an oxygen-containing gas into the anode layer, and a control unit that controls the operations of the fuel introduction unit and the oxidation processing unit. When activating the anode layer, the control unit is configured to operate the oxidation processing unit to introduce an oxygen-containing gas into the anode layer to oxidize the nickel, and unit is configured to operate the fuel introduction unit to introduce a hydrogen-containing gas into the anode layer to reduce the oxidized nickel.

According to the present invention, it is possible to make sufficient use of the characteristic of metal support cells to thereby activate the anode layer.

DETAILED DESCRIPTION OF EMBODIMENTS

Figure 1:
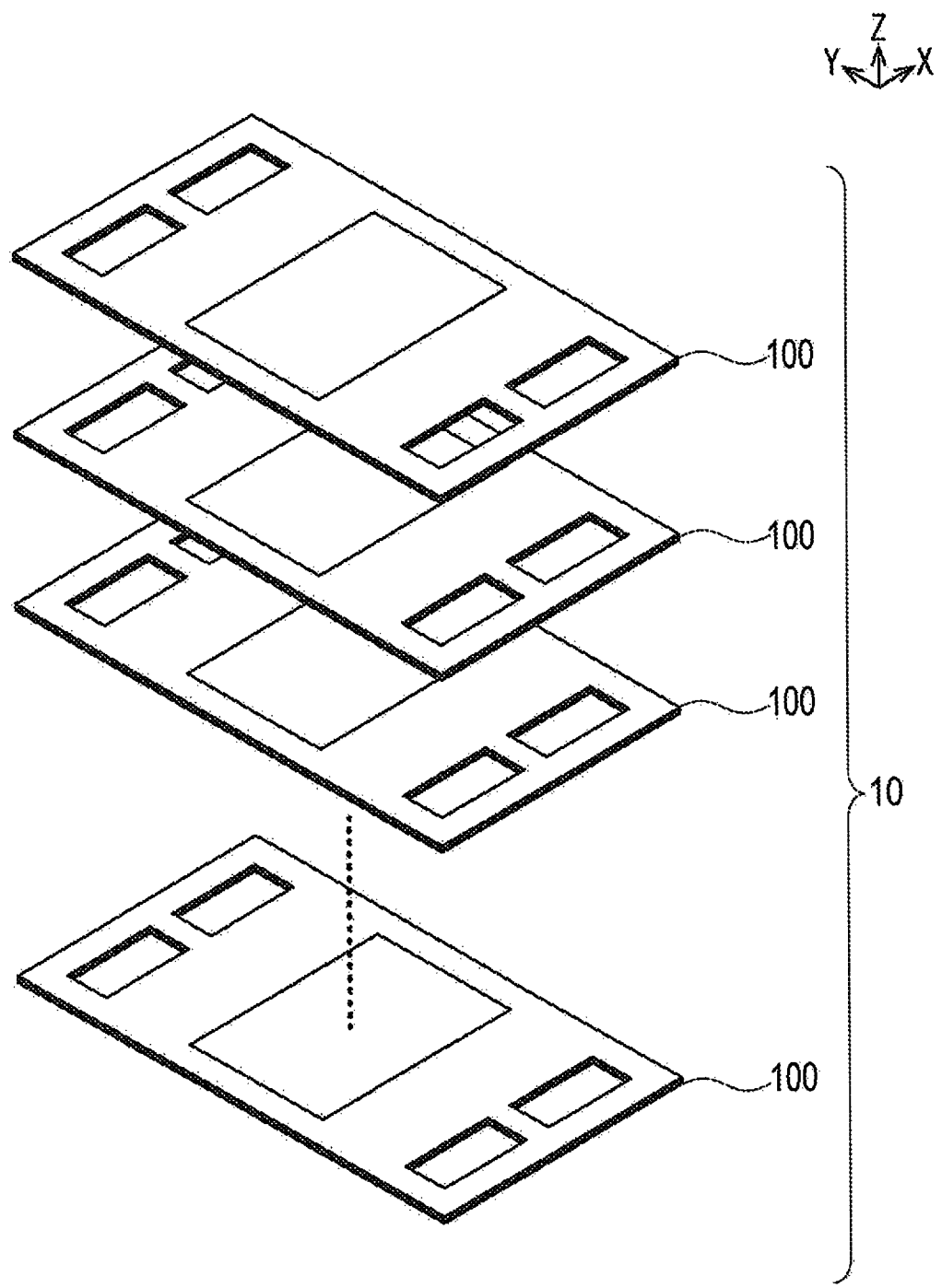
FIG. 1 is an exploded perspective view illustrating a fuel cell stack in a metal support cell type solid oxide fuel cell.

Embodiments of the present invention will be explained below, with reference to the appended drawings. The description below does not limit the technical scope, or the meanings of the terms described in the Claims. Dimensional ratios in the drawings are exaggerated for the sake of convenience of explanation and may differ from actual ratios.

A fuel cell stack 10 in a metal support cell type solid oxide fuel cell will be described with reference to FIGS. 1 to 5. The fuel cell stack 10 according to the present embodiment uses, as an electrolyte, a solid oxide fuel cell (SOFC), which uses an oxide ion conductor such as stabilized zirconia.

For the sake of convenience of the explanation below, an XYZ orthogonal coordinate system is shown is the drawings. The x-axis and the y-axis represent axes that are parallel with the horizontal direction, and the z-axis represents an axis that is parallel with the vertical direction.

FIG. 1 is an exploded perspective view illustrating the fuel cell stack 10 in a metal support cell type solid oxide fuel cell. As shown in FIG. 1, the fuel cell stack 10 is configured by stacking a plurality of cell units 100 in the vertical direction. The vertical direction of the fuel cell stack 10 represented by the z-axis in the drawings is also referred to as the "stacking direction."

Cell Unit 100

Figure 2:
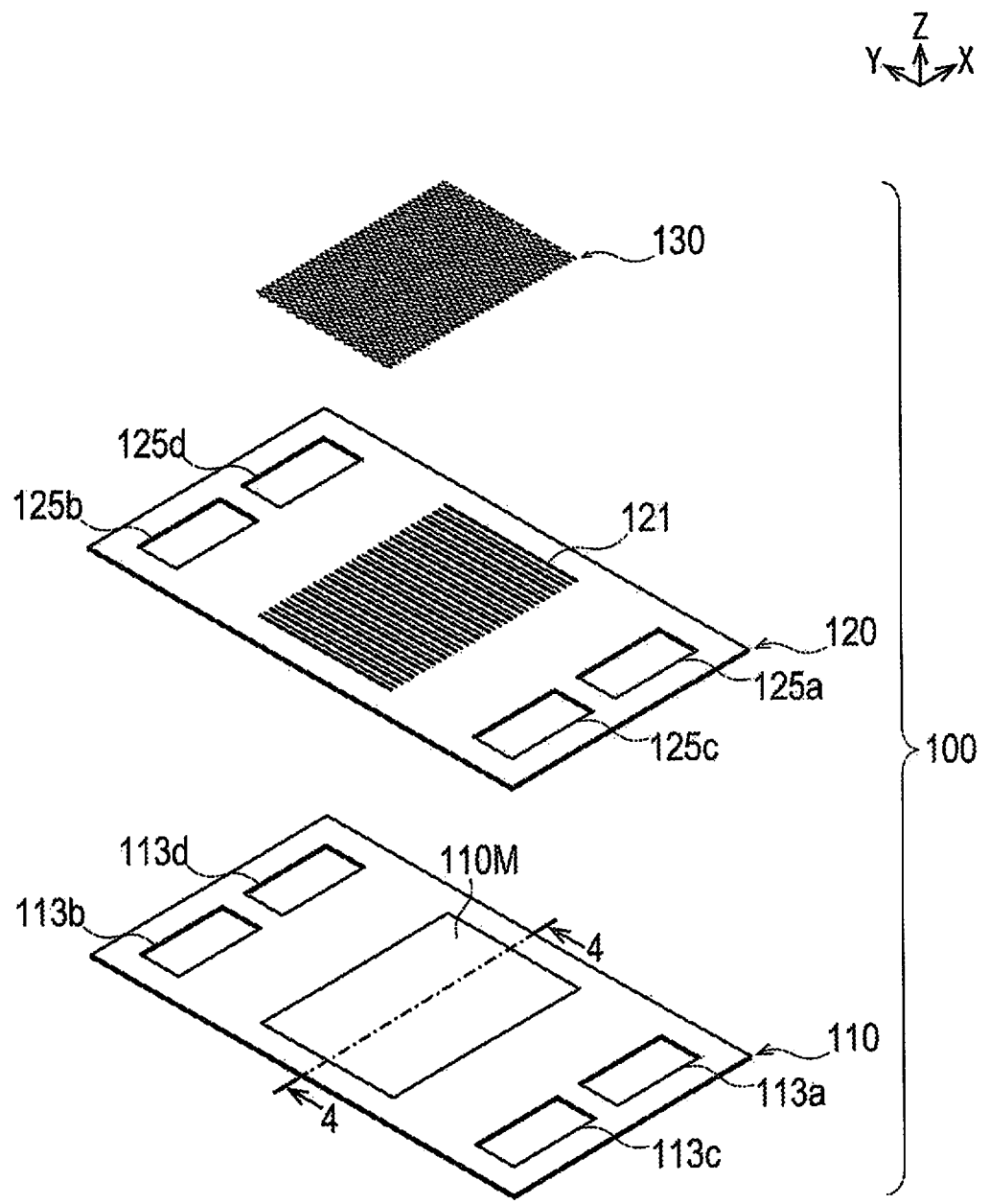
FIG. 2 is an exploded perspective view of a cell unit shown in FIG. 1.

FIG. 2 is an exploded perspective view of the cell unit 100. As shown in FIG. 2, the cell unit 100 is configured by sequentially stacking a metal support cell assembly 110, a separator 120 provided with flow passage portions 121 that define flow passages F for gas, including anode gas and cathode gas, and an auxiliary collector layer 130. A contact material may be disposed between the metal support cell assembly 110 and the auxiliary collector layer 130 so as to bring the two into conductive contact, or the auxiliary collector layer 130 may be omitted.

The cell unit 100 is composed of the metal support cell assembly 110 and the separator 120, and has an outer edge seal part 190 (refer to FIG. 5) that seals the anode gas supplied to the electrolyte electrode assembly. The outer edge seal part 190 is formed of a material having heat resistance and sealing properties. An example of such a material is Thermiculite (registered trademark), the main material of which is vermiculite (vermiculite). Alternatively, it is also possible to use a seal made of a glass component.

Figure 3:
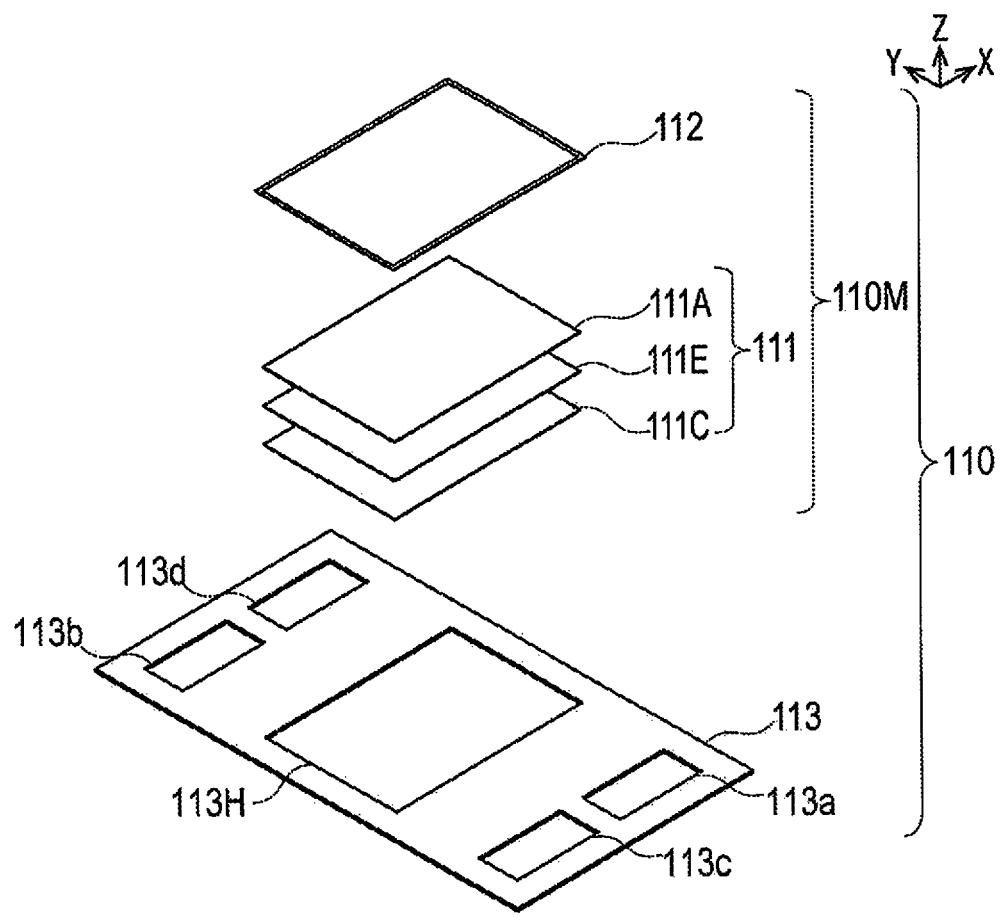
FIG. 3 is an exploded perspective view of a metal support cell assembly shown in FIG. 2.
Figure 4:
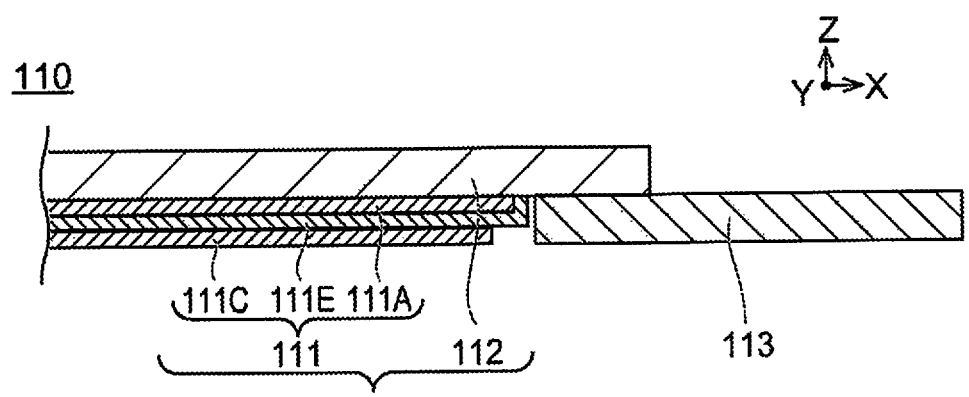
FIG. 4 is a partial cross-sectional view of the metal support cell assembly along line 4-4 in FIG. 2.

FIG. 3 is an exploded perspective view of the metal support cell assembly 110, and FIG. 4 is a partial cross-sectional view thereof. As shown in FIGS. 3 and 4, the metal support cell assembly 110 has a metal support cell (MSC) 110M and a cell frame 113 that holds the outer circumference of the metal support cell 110M.

As shown in FIGS. 3 and 4, the metal support cell 110M has an electrolyte electrode assembly 111 and a metal support part 112 that supports the electrolyte electrode assembly 111 from one side in the vertical direction. The metal support cell 110M has better mechanical strength and more rapid activating ability than electrolyte-supported cells and electrode-supported cells.

Electrolyte Electrode Assembly 111

As shown in FIGS. 3 and 4, the electrolyte electrode assembly 111 is formed by stacking, on both sides of an electrolyte layer 111E, a pair of electrodes, an anode layer 111A and a cathode layer 111C.

The anode layer 111A is a fuel electrode, and reacts an anode gas (for example, hydrogen) with oxide ions to thereby generate an oxide of the anode gas and extract electrons. The anode layer 111A is resistant to a reducing atmosphere, allows the anode gas to pass therethrough, has high electrical (electron and ion) conductivity, and has a catalytic action to react the anode gas with the oxide ions. An example of a material forming the anode layer 111A is a material in which, for example, a metal such as nickel and an oxide ion conductor such as yttria-stabilized zirconia are mixed.

The cathode layer 111C is an oxidant electrode, and reacts a cathode gas (for example, oxygen contained in air) with electrons to convert oxygen molecules to oxide ions. The cathode layer 111C is resistant to oxidizing atmosphere, allows the cathode gas to pass therethrough, has high electric (electron and ion) conductivity, and has a catalytic action to convert oxygen molecules into oxide ions. An example of a material forming the cathode layer 111C is an oxide of, for example, lanthanum, strontium, manganese, or cobalt.

The electrolyte layer 111E allows oxide ions to pass from the cathode layer 111C to the anode layer 111A. The electrolyte layer 111E allows oxide ions to pass but does not allow gas and electrons to pass. An example of a material forming the electrolyte layer 111E is a solid oxide ceramic, such as stabilized zirconia in which yttria, neodymium oxide, samaria, gadria, scandia, and the like are doped.

Metal Support Part 112

As shown in FIGS. 3 and 4, the metal support part 112 supports the electrolyte electrode assembly 111 from the anode layer 111A side. By supporting the electrolyte electrode assembly 111 with the metal support part 112, it is possible to suppress damage to the electrolyte electrode assembly 111 due to bending even if a slight bias in the surface pressure distribution occurs in the electrolyte electrode assembly 111. The metal support part 112 is a porous metal having gas permeability and electrical conductivity. Examples of a material forming the metal support part 112 include corrosion-resistant alloys containing nickel and chromium, corrosion-resistant steel, and stainless steel.

Cell Frame 113

As shown in FIGS. 3 and 4, the cell frame 113 holds the metal support cell 110M from the periphery. As shown in FIG. 3, the cell frame 113 has an opening 113H. The metal support cell 110M is disposed in the opening 113H of the cell frame 113. The outer circumference of the metal support cell 110M is joined to the periphery of the opening 113H of the cell frame 113. An example of a material forming the cell frame 113 is a metal whose surface is subjected to an insulation treatment.

As shown in FIG. 3, the cell frame 113 has an anode gas inlet 113a and an anode gas outlet 113b through which the anode gas flows, and a cathode gas inlet 113c and a cathode gas outlet 113d through which the cathode gas flows.

Separator 120

Figure 5:
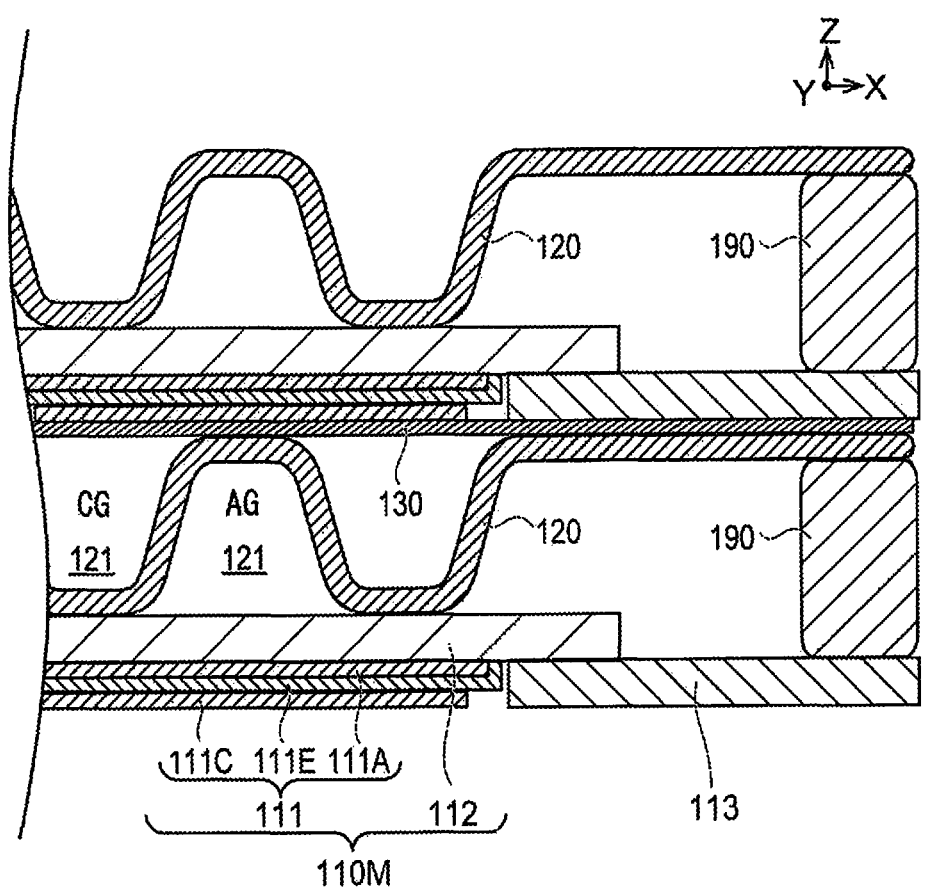
FIG. 5 is a cross-sectional view illustrating the main part of a fuel cell stack.

FIG. 5 is a cross-sectional view illustrating the main part of the fuel cell stack 10. As shown in FIG. 5, the separator 120 has flow passage portions 121 in a region opposing the electrolyte electrode assembly 111 of the metal support cell 110M. The flow passage portions 121 have convex/concave shapes that define flow passages for gas, together with the power generation cell 111 therebetween. Anode gas AG flows in the flow passage portions 121 facing the metal support part 112, and cathode gas CG flows in the flow passage portions 121 facing the auxiliary collector layer 130.

As shown in FIG. 2, the flow passage portions 121 of the separator 120 are formed in an essentially linear shape such that the convex/concave shapes extend in the longitudinal direction Y. As a result, the direction of the flow of the gas that flows along the flow passage portions 121 is the longitudinal direction Y. While not particularly limited, an example of a material forming the separator 120 is a metal.

As shown in FIG. 2, the separator 120 has an anode gas inlet 125a and an anode gas outlet 125b through which the anode gas flows, and a cathode gas inlet 125c and a cathode gas outlet 125d through which the cathode gas flows.

Auxiliary Collector Layer 130

As shown in FIG. 5, the auxiliary collector layer 130 is disposed between the metal support cell 110M and the separator 120, forms a space through which the cathode gas CG passes, equalizes the surface pressure, and assists the electrical contact between the metal support cell 110M and the separator 120. The auxiliary collector layer 130 is, for example, an expanded metal wire mesh. The auxiliary collector layer can be omitted if the characteristics and functions thereof can be achieved by another element.

Fuel Cell System 200

Next, the fuel cell system 200 including a solid oxide fuel cell 210 will be described with reference to FIG. 6.

Figure 6:
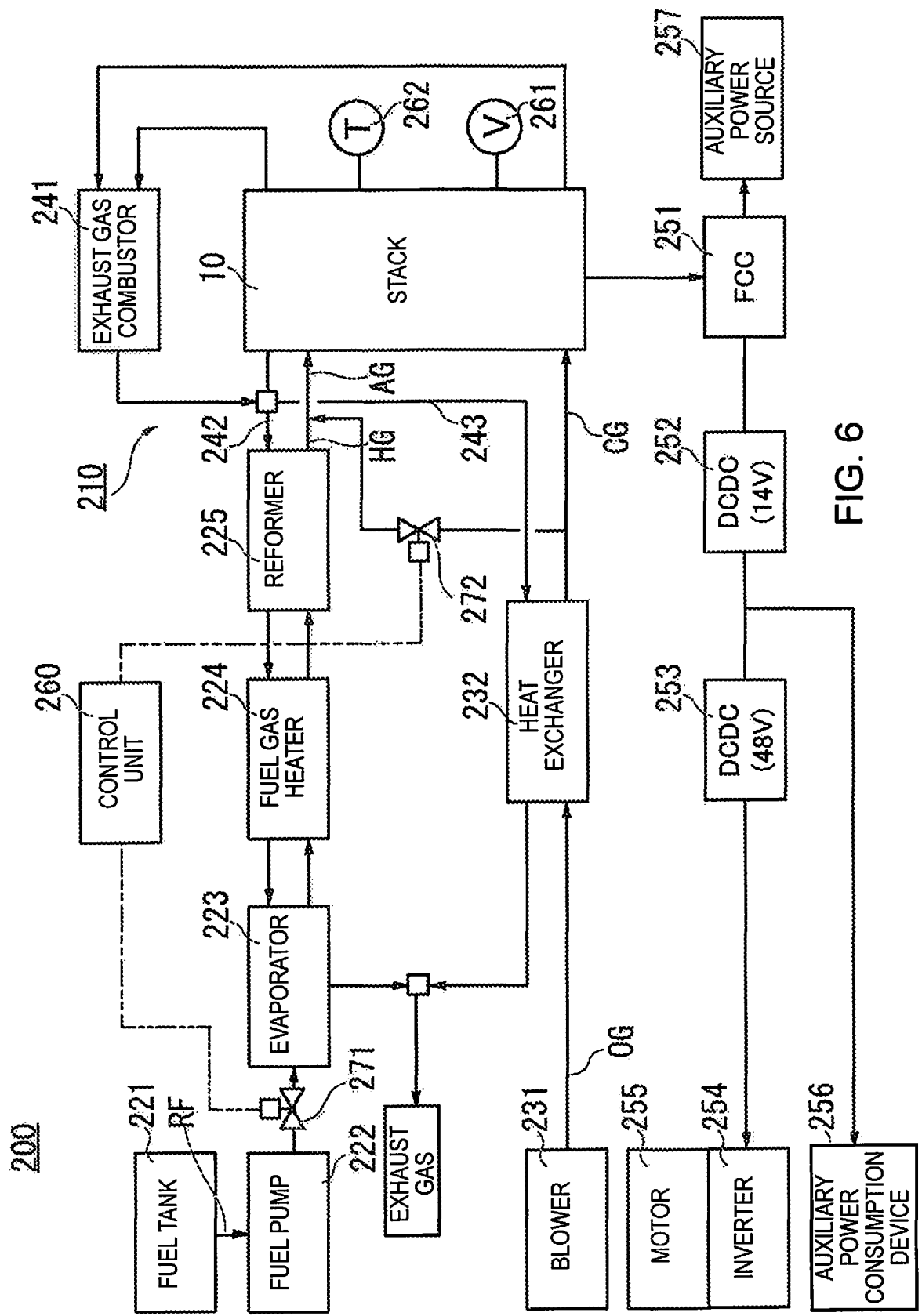
FIG. 6 is a schematic overview illustrating a fuel cell system.

FIG. 6 is a schematic overview illustrating a fuel cell system. The illustrated fuel cell system 200 assumes an SOFC 210 mounted on an automobile. Raw fuel RF such as hydrogen and hydrocarbon is supplied to a reformer 225 via a fuel tank 221, a fuel pump 222, an evaporator 223, and a fuel gas heater 224. The reformer 225 generates hydrogen-rich reformed gas from the raw fuel RF by means of steam reforming. The reformed gas is hydrogen-containing gas HG, which is supplied to the fuel cell stack 10 of the SOFC 210 as the anode gas AG. Oxygen, or oxygen-containing gas OG such as air containing oxygen, is supplied to the fuel cell stack 10 as the cathode gas CG via a blower 231 and a heat exchanger 232. The exhaust gas of the cathode gas CG and the exhaust gas of the anode gas AG discharged from the fuel cell stack 10 are respectively supplied to an exhaust gas combustor 241. The exhaust gas burned in the exhaust gas combustor 241 is split into two flows. One exhaust gas 242 is discharged after sequentially undergoing heat exchange with the raw fuel RF in the reformer 225, the fuel gas heater 224, and the evaporator 223. The other exhaust gas 243 is discharged from a heat exchanger 232 after undergoing heat exchange with the oxygen-containing gas OG in the heat exchanger 232. The exhaust gas discharged from the evaporator 223 and the heat exchanger 232 are mixed and discharged.

The electric power generated in the fuel cell stack 10 is voltage-controlled via an FC converter 251, a DCDC converter (14V) 252, and a DCDC converter (48V) 253 and supplied to an inverter 254. The inverter 254 converts the voltage-controlled DC power into AC power, and supplies the converted power to a travel driving motor 255. The DCDC converter (14V) 252 supplies DC power to auxiliary power consumption devices 256 such as accessories, pumps, and sensors mounted on the automobile. The fuel cell stack 10 is connected to an auxiliary power source 257, such as a secondary battery. The auxiliary power source 257 stores the electric power generated in the fuel cell stack 10 as well as collecting and storing braking energy of the automobile.

The fuel cell system 200 has a control unit 260 for controlling the operation of the entire system. A voltmeter 261 for measuring an open circuit voltage (OCV) of the fuel cell stack 10 is connected to the fuel cell stack 10. The open circuit voltage is the voltage when a load, such as the motor 255, is not connected to the SOFC 210. A value of the open circuit voltage measured by the voltmeter 261 is input to the control unit 260. A temperature sensor 262 for measuring the temperature of the fuel cell stack 10 is connected to the fuel cell stack 10. A value of the temperature of the fuel cell stack 10 measured by the temperature sensor 262 is input to the control unit 260.

A portion of the raw fuel RF can be supplied to the exhaust gas combustor 241 with the fuel pump 222. The temperature of the oxygen-containing gas OG supplied to the cathode layer 111C is adjusted by adjusting the amount of the raw fuel RF supplied to the exhaust gas combustor 241, the combustion temperature in the exhaust gas combustor 241, and the amount of high-temperature exhaust gas supplied from the exhaust gas combustor 241 to the heat exchanger 232.

The temperature of the fuel cell stack 10 can be made higher than the normal operating temperature by increasing the temperature of the oxygen-containing gas OG supplied to the cathode layer 111C. The temperature of the fuel cell stack 10 is about 600° C. to 650° C. under normal operation. In the present embodiment, the temperature of the fuel cell stack 10 can be set to about 850° C.

Activation of the anode layer 111A in the SOFC 210 will be described next.

As described above, the SOFC 210 exhibits a gradual decrease in voltage when operated over a long period of time. The voltage drop of the SOFC 210 is known to be caused by a decrease in catalyst activity of the anode layer 111A. Alternatively, the power generation characteristics may be lower than what normally could be achieved before treatment after assembly of the stack.

The present embodiment provides an anode layer activation method that makes sufficient use of the characteristic excellent mechanical strength of the metal support cell 110M. That is, The anode layer activation method in a solid oxide fuel cell according to the present embodiment is a method for activating the anode layer 111A in a solid oxide fuel cell having the metal support cell 110M, in which the nickel containing anode layer 111A, the electrolyte layer 111E, and the cathode layer 111C are stacked on the metal support part 112 made of metal. In this anode layer activation method, first, the oxygen-containing gas OG is introduced into the anode layer 111A to oxidize the nickel (Ni), after which the hydrogen-containing gas HG is introduced into the anode layer 111A to reduce the oxidized nickel (NiO).

Figure 7A:
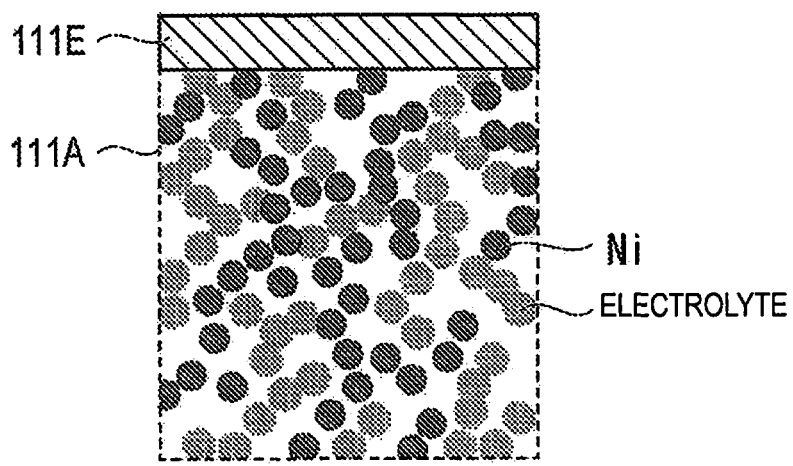
FIG. 7A is a diagram schematically illustrating an anode layer in a state before cell activation.

Activation of the anode layer 111A by means of oxidation and reduction will be described with reference to FIGS. 7A, 7B, and 7C. FIG. 7A is a schematic diagram illustrating the anode layer 111A before cell activation, FIG. 7B is a schematic diagram illustrating the anode layer 111A in a state in which the nickel is oxidized, and FIG. 7C is a schematic diagram illustrating the anode layer 111A in a state in which the oxidized nickel is reduced.

As shown in FIG. 7A, before cell activation, there are relatively many locations in the anode layer 111A where adjacent nickel are not connected to each other but are rather separated. As a result, there are relatively few conduction paths that electrically connect the electrolyte layer 111E to the metal support part 112 in the anode layer 111A.

Figure 7B:
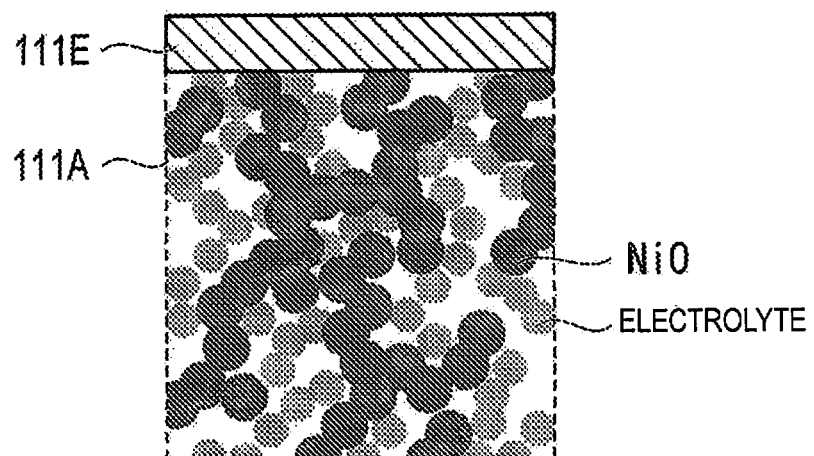
FIG. 7B is a diagram schematically illustrating the anode layer in a state in which nickel is oxidized.
Figure 7C:
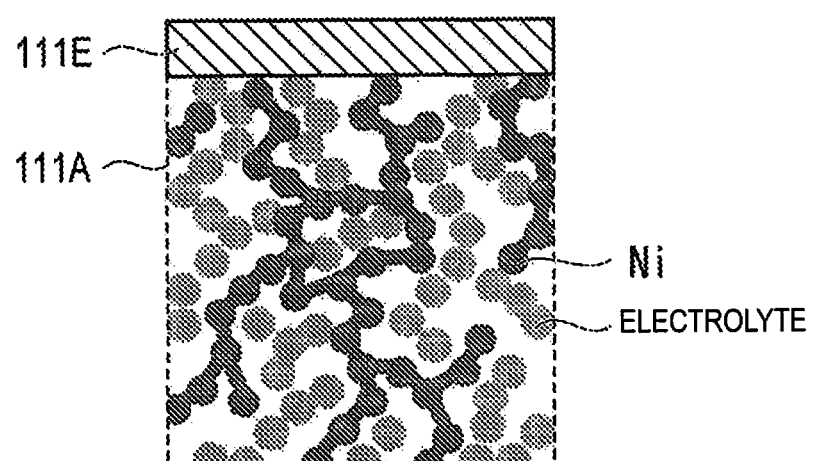
FIG. 7C is a diagram schematically illustrating the anode layer in a state in which the oxidized nickel is reduced.

As shown in FIG. 7B, when the oxygen-containing gas OG is introduced into the anode layer 111A to oxidize the nickel, as a result of the oxidation reaction

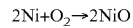

$$2Ni+O_2 \rightarrow 2NiO$$

nickel oxide (NiO) is formed. The nickel oxide formed by oxidizing the nickel connects the originally unconnected network of nickel. Since the volume of nickel oxide is larger (expands) than nickel, nickel that were out of reach (not in contact) can be connected. "Connects the originally unconnected network of nickel" means not only when nickel that were not originally in contact with each other come into contact, but also cases in which the nickel that were in contact come in close contact such that the contact area increases. However, catalyst activity is low when still in the nickel oxide state.

The nickel oxide formed by oxidizing the nickel has a larger volume (expands) than nickel. Since the metal support cell 110M has the characteristic of having excellent mechanical strength, cracks will not occur in the electrolyte layer 111E or in the anode layer 111A itself supported by the metal support part 112, even if such volume change occurs.

As shown in FIG. 7C, by introducing the hydrogen-containing gas HG into the anode layer 111A, the oxidized nickel is reduced while maintaining the connected nickel network, so that a relatively large number of conduction paths are formed. Although the volume decreases when the nickel oxide is returned to nickel, it is thought that the volume shrinks while maintaining the connection, rather than shrinkage being due to severed oxide connections. In addition to the formation of the conduction paths, a three-phase boundary (Three-Phase Boundary: TPB) defined by the three phases of the nickel, an electrolyte, and pores is increased compared to the state before cell activation (FIG. 7A). As a result of the nickel oxide being reduced to nickel, the catalyst activity becomes higher than that of NiO.

Figure 8:
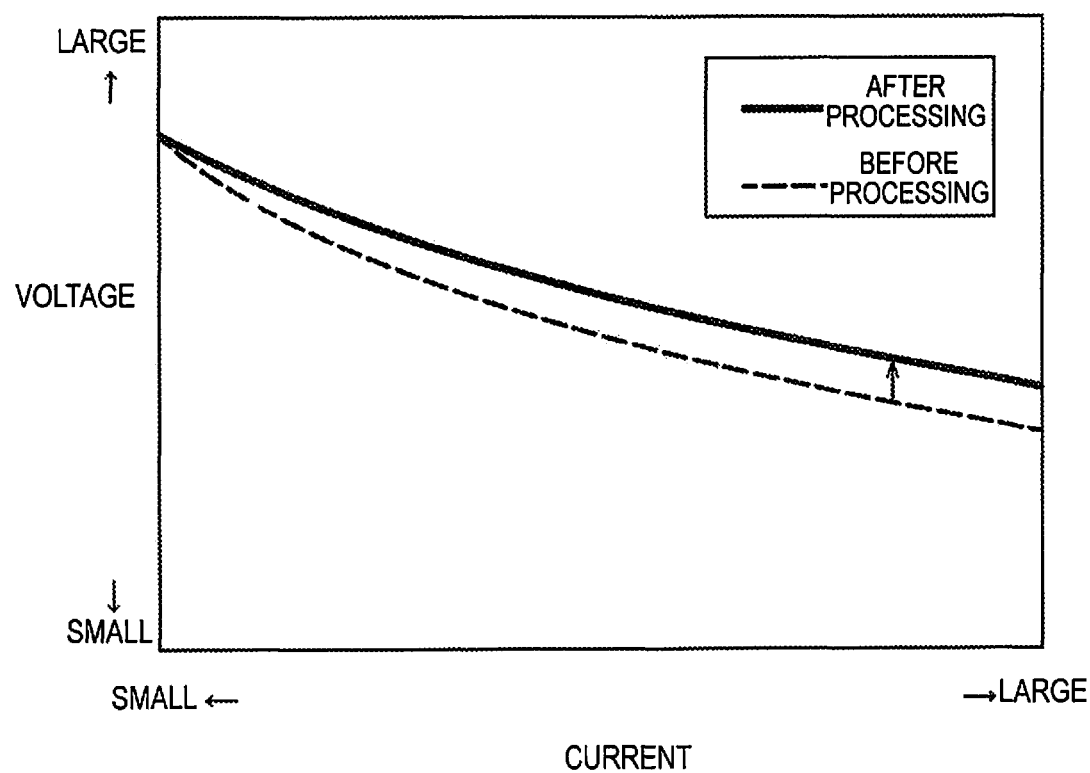
FIG. 8 is diagram schematically illustrating the relationship between current and cell voltage, which represents the performance of a solid oxide fuel cell.

FIG. 8 is a diagram schematically illustrating the relationship between current and cell voltage, which represents the performance of the SOFC 210, wherein the broken line indicates the relationship between the current and the cell voltage before the anode layer 111A activation process, and the solid line indicates the relationship between the current and the cell voltage after the anode layer 111A activation process. According to the anode layer 111A activation method of the present embodiment, the electrochemical reaction in the anode layer 111A is activated, and the performance of the SOFC 210 is improved.

Conventionally, it has always been the case that the oxygen-containing gas OG is not introduced into the anode layer 111A. This is because, as a result of the volume of the nickel or the entire anode layer 111A expanding when nickel is oxidized to nickel oxide, there is the risk that cracks occur in the electrolyte layer 111E or the anode layer 111A itself, leading to destruction of the power generation cell 111.

As a result of intensive research into a novel anode layer activation method, focusing on the characteristic excellent mechanical strength of the metal support cell 110M, the present inventors broke through the conventional stereotype of not introducing the oxygen-containing gas OG into the anode layer 111A, and devised the above-described method for activating an anode layer in a solid oxide fuel cell.

A solid oxide fuel cell system 200 according to the present embodiment that embodies the anode layer activation method described above comprises the SOFC 210 having the metal support cell 110M in which the nickel containing anode layer 111A, the electrolyte layer 111E, and the cathode layer 111C are stacked on the metal support part 112, the fuel introduction unit for introducing the hydrogen-containing gas HG into the anode layer 111A, the oxidation processing unit for introducing the oxygen-containing gas OG into the anode layer 111A, and the control unit 260 for controlling the operations of the fuel introduction unit and the oxidation processing unit. When activating the anode layer 111A, the control unit 260 operates the oxidation processing unit and introduces the oxygen-containing gas OG into the anode layer 111A to oxidize the nickel, and operates the fuel introduction unit and introduces the hydrogen-containing gas HG into the anode layer 111A to reduce the oxidized nickel.

As shown in FIG. 6, the SOFC 210 has a first valve 271 that switches between introduction of the hydrogen-containing gas HG into the anode layer 111A and stopping the introduction thereof. The SOFC 210 has a second valve 272 that switches between introduction of the oxygen-containing gas OG supplied to the cathode layer 111C into the anode layer 111A and stopping the introduction thereof. The hydrogen-containing gas HG is introduced into the anode layer 111A by opening the first valve 271 and closing the second valve 272. From this state, the introduction of the hydrogen-containing gas HG into the anode layer 111A is stopped by closing the first valve 271. The oxygen-containing gas OG is introduced into the anode layer 111A by closing the first valve 271 and opening the second valve 272. From this state, the introduction of the oxygen-containing gas OG into the anode layer 111A is stopped by closing the second valve 272.

In the fuel cell system 200 of the illustrated example, the constituent devices (221, 222, 223, 224, 225) from the fuel tank 221 to the fuel cell stack 10, the first valve 271, and the second valve 272 constitute the fuel introduction unit for introducing the hydrogen-containing gas HG into the anode layer 111A. In addition, the blower 231, the heat exchanger 232, the first valve 271, and the second valve 272 constitute the oxidation processing unit for introducing the oxygen-containing gas OG into the anode layer 111A.

The first embodiment of the anode layer 111A activation process will be described next.

Figure 9:
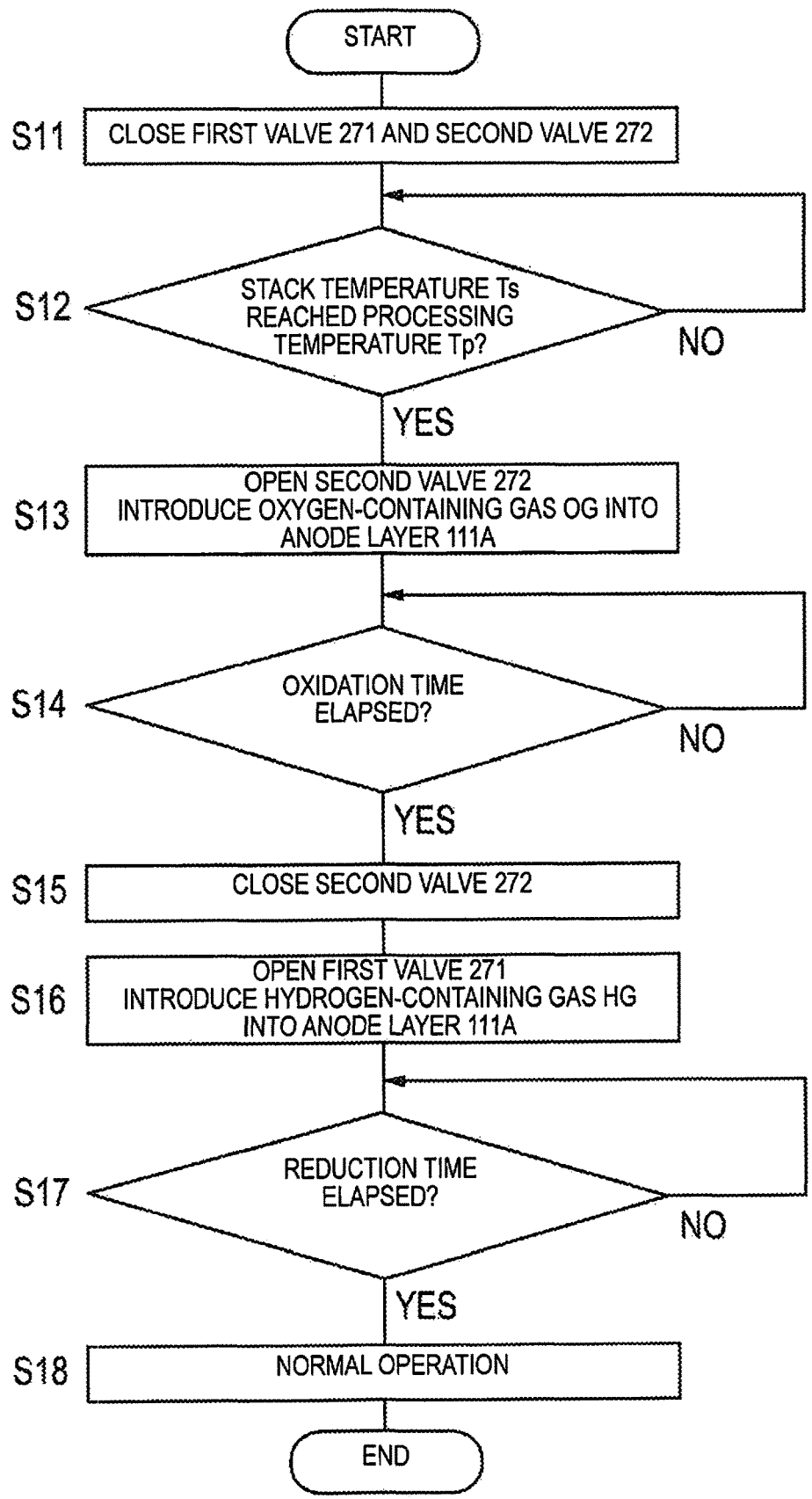
FIG. 9 is a flow chart illustrating a procedure for executing a first embodiment of an anode layer activation process.
Figure 10:
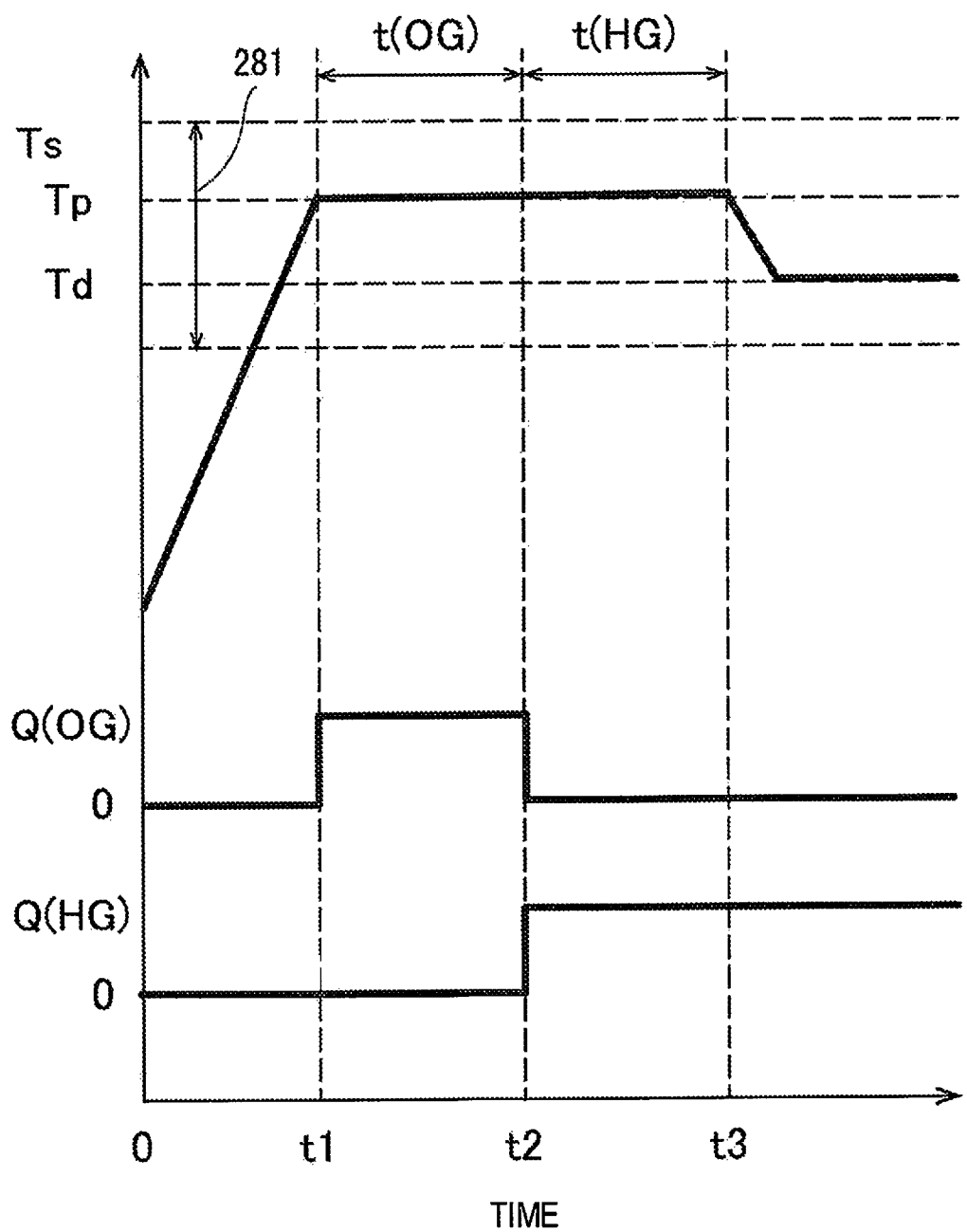
FIG. 10 is a time chart illustrating the first embodiment of the anode layer activation process.

FIG. 9 is a flow chart illustrating a procedure for executing the first embodiment of the anode layer 111A activation process. FIG. 10 is a time chart illustrating the first embodiment of the anode layer 111A activation process. In the time chart of FIG. 10, the horizontal axis is time. The vertical axis schematically represents the temperature of the fuel cell stack 10 (hereinafter sometimes simply referred to as "stack temperature Ts"), the flow rate Q (OG) of the oxygen-containing gas OG supplied to the anode layer 111A, and the flow rate Q (HG) of the hydrogen-containing gas HG supplied to the anode layer 111A. The temperature range indicated by the arrow with the reference symbol 281 is the temperature range in which the oxygen-containing gas OG and the hydrogen-containing gas HG are introduced, that is, the temperature range of a processing temperature Tp at which the oxidation/reduction of the nickel are carried out.

As shown in FIG. 9, when the anode layer 11 1A activation process is started (t=0 in FIG. 10), the control unit 260 closes the first valve 271 and the second valve 272 (Step S11). The hydrogen-containing gas HG and the oxygen-containing gas OG have not been introduced into the anode layer 111A. An arbitrary determination criterion for determining whether or not to carry out the anode layer 111A activation process may be set, such as whether an integrated operating time of the SOFC 210 has become greater than or equal to a preset threshold, or whether the open circuit voltage measured by the voltmeter 261 has become less than or equal to a preset threshold.

The control unit 260 determines whether or not the temperature of the fuel cell stack 10 measured by the temperature sensor 262 has reached the processing temperature Tp for carrying out activation (Step S12). The stack temperature Ts can be made higher than the normal operating temperature Td by increasing the temperature of the oxygen-containing gas OG supplied to the cathode layer 111C. The control unit 260 stands by until the stack temperature Ts reaches the processing temperature Tp (Step S12 "NO").

When the stack temperature Ts reaches the processing temperature Tp (t=t1 in FIG. 10), the control unit 260 opens the second valve 272 of the oxidation processing unit to introduce the oxygen-containing gas OG into the anode layer 111A (Step S12 "YES," Step S13). The length of time for introducing the oxygen-containing gas OG into the anode layer 111A is set in advance. When opening the second valve 272, the control unit 260 starts to count the elapsed time (Step S14).

When the oxygen-containing gas OG is introduced into the anode layer 111A to oxidize the nickel, as a result of the oxidation reaction

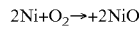

nickel oxide is formed.

When time t (OG) for introducing the oxygen-containing gas OG elapses (t=t2 in FIG. 10), the control unit 260 closes the second valve 272 of the oxidation processing unit to stop the introduction of the oxygen-containing gas OG into the anode layer 111A (Step S14 "YES," Step S15).

The control unit 260 opens the first valve 271 of the fuel introduction unit to introduce the hydrogen-containing gas HG into the anode layer 111A (Step S16). The length of time t (HG) for introducing the hydrogen-containing gas HG into the anode layer 111A is set in advance. When opening the first valve 271, the control unit 260 starts to count the elapsed time (Step S17).

The hydrogen-containing gas HG is introduced into the anode layer 111A to reduce the oxidized nickel (NiO).

By means of such oxidation and reduction of the anode layer 111A, the anode layer 111A is activated and the performance of the SOFC 210 is restored.

When the time t (HG) for introducing the hydrogen-containing gas HG elapses (t=t3 in FIG. 10), the control unit 260 lowers the stack temperature Ts to the operating temperature Td, and operates the SOFC 210 normally (Step S18).

As described above, The anode layer activation method in a solid oxide fuel cell according to the present embodiment is a method for activating the anode layer 111A in a solid oxide fuel cell having the metal support cell 110M. In this anode layer activation method, first, the oxygen-containing gas OG is introduced into the anode layer 111A to oxidize the nickel (Ni), after which the hydrogen-containing gas HG is introduced into the anode layer 111A to reduce the oxidized nickel (NiO).

In addition, the solid oxide fuel cell system 200 according to the present embodiment that embodies the anode layer activation method described above comprises the SOFC 210 having the metal support cell 110M, the fuel introduction unit for introducing the hydrogen-containing gas HG into the anode layer 111A, the oxidation processing unit for introducing the oxygen-containing gas OG into the anode layer 111A, and the control unit 260 for controlling the operations of the fuel introduction unit and the oxidation processing unit. When activating the anode layer 111A, the control unit 260 operates the oxidation processing unit and introduces the oxygen-containing gas OG into the anode layer 111A to oxidize the nickel, and operates the fuel introduction unit and introduces the hydrogen-containing gas HG into the anode layer 111A to reduce the oxidized nickel.

According to the anode layer activation method and the solid oxide fuel cell system 200 configured in this manner, a relatively large number of conduction paths, which electrically connect the electrolyte layer 111E to the metal support part 112, are formed in the anode layer 111A, by oxidizing and reducing the nickel of the anode layer 111A. In addition, the three-phase boundary defined by the three phases of the nickel, an electrolyte, and pores increase. As a result, the electrochemical reaction in the anode layer 111A is activated, and the performance of the SOFC 210 is improved.

The nickel oxide formed by oxidizing the nickel has a larger volume (expands) than nickel. Since the metal support cell 110M has the characteristic of having excellent mechanical strength, cracks will not occur in the electrolyte layer 111E or in the anode layer 111A itself supported by the metal support part 112, even if such volume change occurs.

In addition, since the oxygen-containing gas OG is normally used as the cathode gas CG and the hydrogen-containing gas HG is normally used as the anode gas AG in the SOFC 210, it is not necessary to assemble a dedicated device used only for the anode layer 111A activation process of the SOFC 210. Accordingly, it is possible to execute the anode layer 111A activation process and the performance improvement process of the SOFC 210 without adding an extra system. Moreover, since it is applied to the SOFC 210 mounted on an automobile, it is not necessary to execute the performance improvement process in another location, such as a dedicated factory for executing the activation process. The performance improvement process of the SOFC 210 can be executed using the simple fuel cell system 200 mounted on the automobile. Additionally, it is also possible to immediately execute the activation process when the performance improvement process of the SOFC 210 becomes necessary.

The introduction of the oxygen-containing gas OG and the hydrogen-containing gas HG is preferably executed at the processing temperature Tp of 400° C. to 850° C. If the temperatures of the oxygen-containing gas OG and the hydrogen-containing gas HG are less than 400° C., the oxidation reaction and the reduction reaction progress slowly, and the reaction time also becomes long. Additionally, if the temperatures of the oxygen-containing gas OG and the hydrogen-containing gas HG are increased, the reactions easily progress, and the processing time is also shortened. However, when the temperatures of the oxygen-containing gas OG and the hydrogen-containing gas HG exceed 850° C., the metal support part 112, the cell frame 113, and the like are oxidized, which could cause deterioration of the anode layer 111A. Accordingly, in order to generate the necessary oxidation/reduction reaction without deteriorating the anode layer 111A, the introduction of the oxygen-containing gas OG and the hydrogen-containing gas HG is preferably executed at the processing temperature Tp of 400° C. to 850° C.

The introduction of the oxygen-containing gas OG and the hydrogen-containing gas HG is preferably executed at a processing temperature Tp that is higher than the operating temperature Td of the SOFC 210. The operating temperature Td is, for example, 600° C. to 650° C.; for example, the operating temperature Td is 650° C. In the case of this operating temperature Td, the processing temperature Tp is, for example, 700° C. Although it is not preferable to operate the SOFC 210 for a long period of time at a temperature higher than the normal operating temperature Td, the cell is not deteriorated even if the stack temperature Ts is raised to a temperature higher than the normal operating temperature Td, if only for a relatively short period of time to carry out the anode layer 111A activation process. Additionally, since the temperatures of the oxygen-containing gas OG and the hydrogen-containing gas HG are increased, the reactions easily progress, and the processing time can be shortened. Accordingly, in order to promote the necessary oxidation/ reduction reaction without deteriorating the anode layer 111A, the introduction of the oxygen-containing gas OG and the hydrogen-containing gas HG is preferably executed at a processing temperature Tp that is higher than the operating temperature Td of the SOFC 210.

The oxygen-containing gas OG is preferably air. Since air is normally used as the cathode gas CG in the SOFC 210, it is not necessary to assemble a dedicated device used only for the anode layer 111A activation process to the SOFC 210. Accordingly, it is possible to execute the anode layer 111A activation process and the performance improvement process of the SOFC 210 without adding an extra system. Moreover, since it is applied to the SOFC 210 mounted on an automobile, it is not necessary to execute the performance improvement process in another location, such as a dedicated factory for executing the activation process. The performance improvement process of the SOFC 210 can be executed using the simple fuel cell system 200 mounted on the automobile. Additionally, it is also possible to immediately execute the activation process when the performance improvement process of the SOFC 210 becomes necessary.

The introduction times of the oxygen-containing gas OG and the hydrogen-containing gas HG are preferably set to 2 hours or more. It is thereby possible to sufficiently cause the oxidation/reduction reaction, and to obtain a sufficient activation effect of the anode layer 111A. Here, the introduction time of 2 hours or more is the time at which the reaction is kinetically completed, and can be determined as follows. When measuring change in the mass of the anode layer 111A after the activation process is started, the mass increases as the nickel is oxidized in an oxidation process, so that the time at which the mass no longer increases could be regarded as the time at which the oxidation reaction is completed. Thus, the elapsed time until the oxidation reaction was completed was determined as the introduction time (2 hours) for the oxygen-containing gas OG. Since the mass decreases as the nickel oxide is reduced in a reduction process, the time at which the mass no longer decreases could be regarded as the time at which the reduction reaction is completed. Thus, the elapsed time until the reduction reaction was completed was determined as the introduction time (2 hours) for the hydrogen-containing gas HG.

The respective potential of the anode layer 111A at the time of the oxidation process and the time of the reduction process is a natural potential. In the technique disclosed in Patent Document 1, a pulse voltage is applied from an external power source to the anode layer 111A and/or the cathode layer 111C to carry out the anode layer 111A activation process. In contrast, in the present embodiment, the anode layer 111A activation process is carried out without forcibly sweeping the potential. It is not necessary to assemble a dedicated device used only for the anode layer 111A activation process of the SOFC 210. Accordingly, it is possible to execute the anode layer 111A activation process and the performance improvement process of the SOFC 210 without adding an extra system. Preferably, only one set of the oxidation process and the reduction process of the anode layer 111A is carried out per one switch to the introduction of the hydrogen-containing gas HG after the introduction of the oxygen-containing gas OG. Although the anode layer 111A activation process can be executed a plurality of times, if the oxidation and reduction set is repeated a plurality of times per one switch sintering of the nickel could occur, or the nickel grains could become large. If such a deterioration occurs, the effective catalytic reaction area necessary for the reaction of the anode layer 111A is lost. Accordingly, in order to prevent the deterioration of the anode layer 111A, only one set of the oxidation process and the reduction process of the anode layer 111A is carried out per one switch to the introduction of the hydrogen-containing gas HG after the introduction of the oxygen-containing gas OG.

The second embodiment of the anode layer 111A activation process will be described next.

Figure 11:
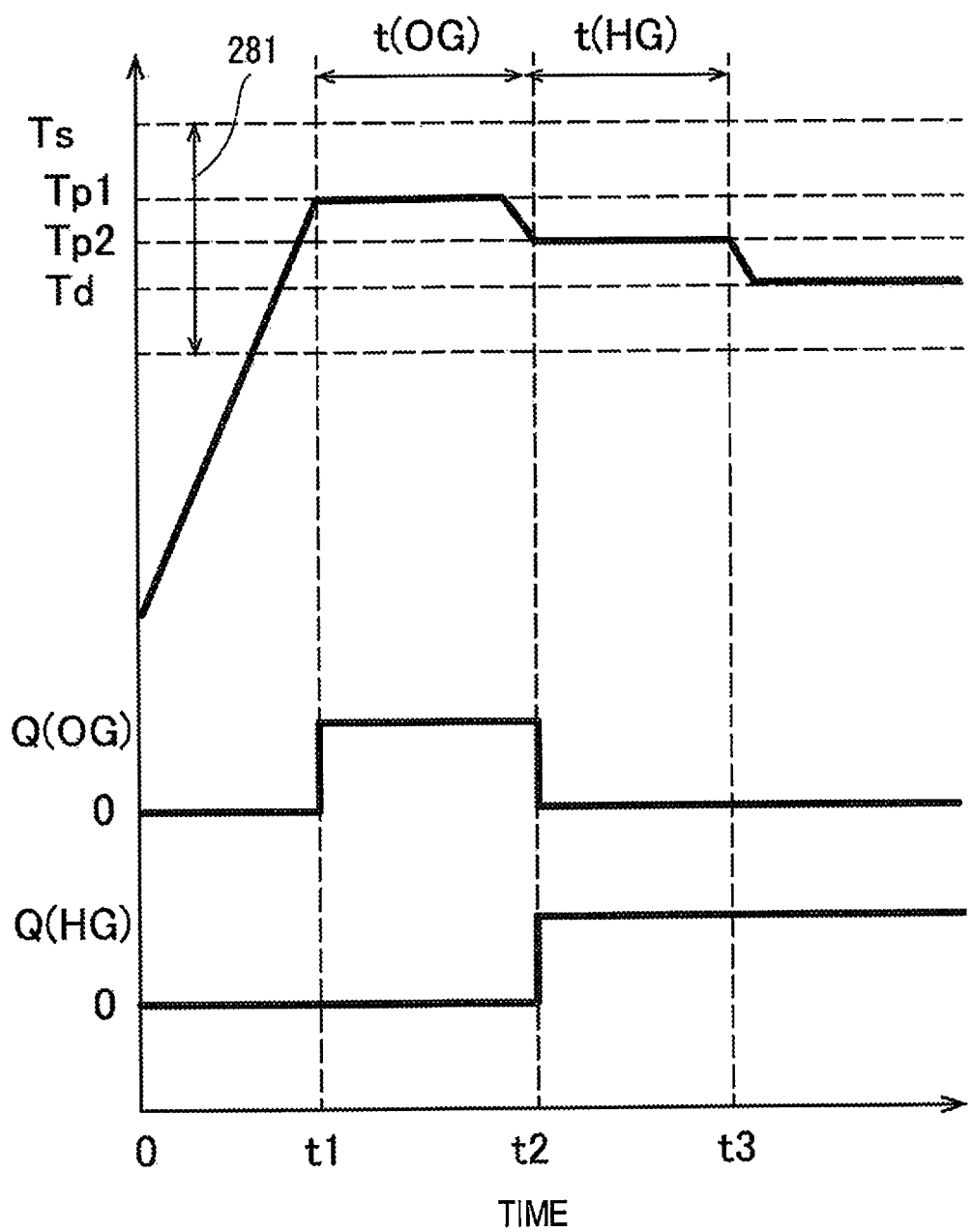
FIG. 11 is a time chart illustrating a second embodiment of the anode layer activation process.

FIG. 11 is a time chart illustrating the second embodiment of the anode layer 111A activation process.

The second embodiment of the anode layer 111A activation process is different from the first embodiment in the point that the introduction temperature of the hydrogen-containing gas HG is set to be lower than the introduction temperature of the oxygen-containing gas OG. The introduction temperature Tp1 of the oxygen-containing gas OG is, for example, 750° C., and the introduction temperature Tp2 of the hydrogen-containing gas HG is, for example, 700° C. The other points are the same as those in the first embodiment.

The introduction temperature for the hydrogen-containing gas HG is preferably lower than the introduction temperature for the oxygen-containing gas OG. It is thereby possible to avoid undesired phenomena, such as sintering, while reducing the nickel oxide, even if the introduction temperature for the hydrogen-containing gas HG is reduced. Accordingly, in order to generate the necessary reduction reaction without deteriorating the anode layer 111A, the introduction temperature for the hydrogen-containing gas HG is preferably lower than the introduction temperature for the oxygen-containing gas OG.

The third embodiment of the anode layer 111A activation process will be described next.

Figure 12:
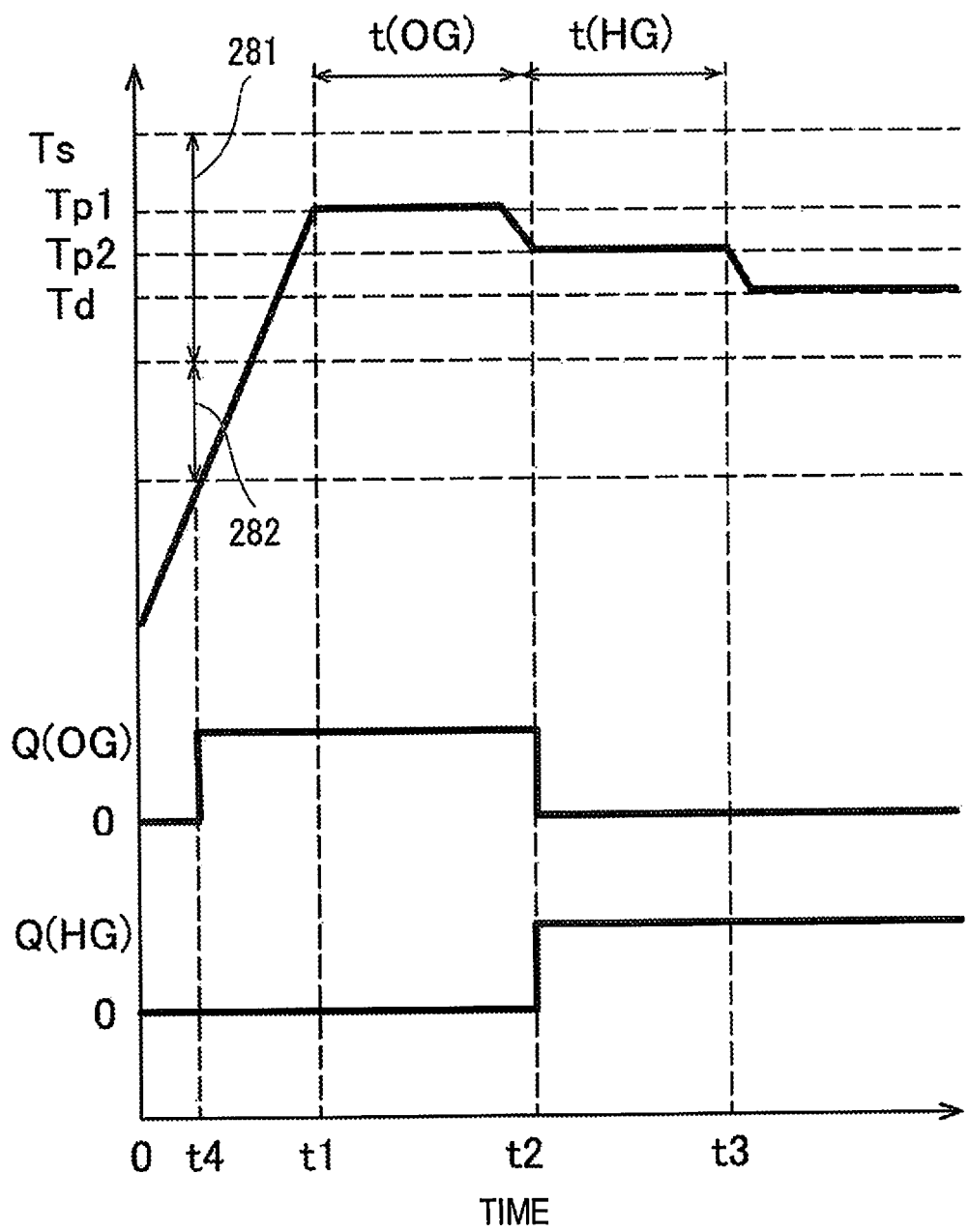
FIG. 12 is a time chart illustrating a third embodiment of the anode layer activation process.

FIG. 12 is a time chart illustrating the third embodiment of the anode layer 111A activation process. In the time chart of FIG. 12, the vertical axis schematically represents the stack temperature Ts, the flow rate Q (OG) of the oxygen-containing gas OG, and the flow rate Q (HG) of the hydrogen-containing gas HG. The temperature range indicated by the arrow with the reference symbol 281 is the temperature range of the processing temperature Tp at which the oxidation/reduction of the nickel are carried out. The temperature range indicated by the arrow with the reference symbol 282 is a firing temperature range of a binder contained in the constituent members of the SOFC 210.

The third embodiment of the anode layer WA activation process is different from the second embodiment in the point that the SOFC 210 includes a constituent member that contains a binder, and that the binder of the constituent member is burned and oxidized when oxidizing the nickel.

One example of a constituent member containing a binder is the outer edge seal part 190. In this case, the material forming the outer edge seal part 190 contains glass fiber as the main component instead of Thermiculite (registered trademark), and contains carbon as the binder.

In the third embodiment of the anode layer 111A activation process, the temperature range of the processing temperature Tp for carrying out oxidation/reduction of the nickel, and the firing temperature range of the binder do not overlap. When the stack temperature Ts reaches a lower limit of the firing temperature range of the binder (t=t4 in FIG. 12), the second valve 272 of the oxidation processing unit opens to introduce the oxygen-containing gas OG into the anode layer 111A. As the stack temperature Ts rises, the binder is burned and oxidized.

The SOFC 210 preferably includes a constituent member that contains a binder, and the binder of the constituent member is burned and oxidized when oxidizing the nickel. In the case that a constituent member containing a binder is provided, the oxidation of the nickel and the firing (oxidation) of the binder are completed in a single process, when assembling the fuel cell stack 10. Thus, it is possible to simultaneously execute the anode layer 111A activation process and the sealing process of the fuel cell stack 10, and to manufacture the activated fuel cell stack 10 in a short period of time.

Although the outer edge seal part 190 is exemplified as the constituent member that contains the binder, the invention is not limited to this case. For example, if the binder component remains in another member, the oxidation of the nickel and the firing (oxidation) of the binder can be completed in a single process.

The fourth embodiment of the anode layer 111A activation process will be described next.

Figure 13:
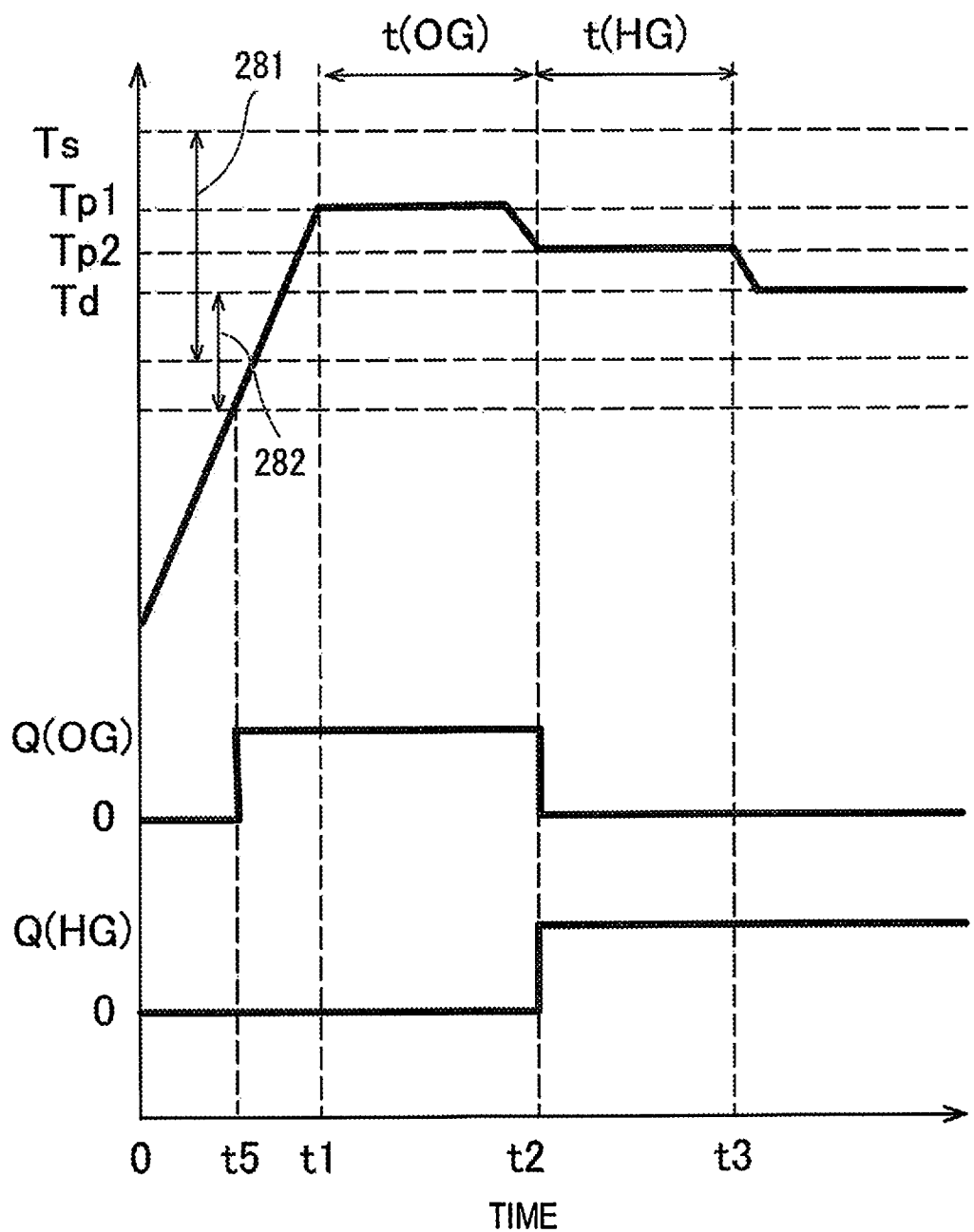
FIG. 13 is a time chart illustrating a fourth embodiment of the anode layer activation process.

FIG. 13 is a time chart illustrating the fourth embodiment of the anode layer 111A activation process.

The fourth embodiment of the anode layer 111A activation process is different from the third embodiment in the point that the temperature range of the processing temperature Tp for carrying out oxidation/reduction of the nickel, and the firing temperature range of the binder overlap.

In the fourth embodiment of the anode layer 111A activation process, when the stack temperature Ts reaches a lower limit of the firing temperature range of the binder (t=t5 in FIG. 13), the second valve 272 of the oxidation processing unit opens to introduce the oxygen-containing gas OG into the anode layer 111A. As the stack temperature Ts rises, the binder is burned and oxidized. Since the temperature range of the processing temperature Tp and the firing temperature range of the binder overlap, the oxidation of the nickel and the firing of the binder progress simultaneously.

The fifth embodiment of the anode layer 111A activation process will be described next.

Figure 14:
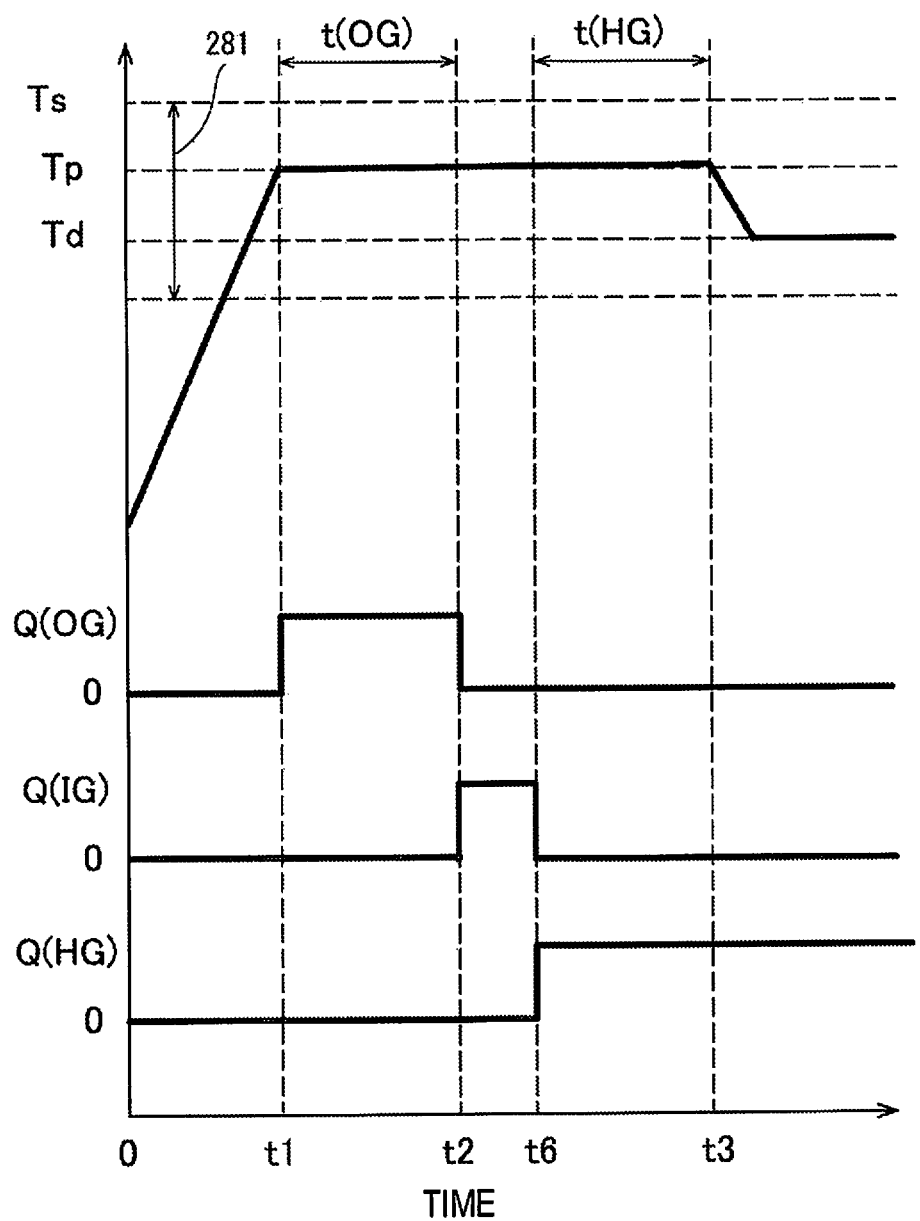
FIG. 14 is a time chart illustrating a fifth embodiment of the anode layer activation process.

FIG. 14 is a time chart illustrating the fifth embodiment of the anode layer 111A activation process. In the time chart of FIG. 14, the vertical axis schematically represents the stack temperature Ts, the flow rate Q (OG) of the oxygen-containing gas OG, and the flow rate Q (HG) of the hydrogen-containing gas HG, and further schematically represent a flow rate Q (IG) of inert gas that is supplied to the anode layer 111A.

The fifth embodiment of the anode layer 111A activation process is different from the first embodiment in the point that the introduced oxygen-containing gas OG is scavenged from the anode layer 111A before introducing the hydrogen-containing gas HG.

In addition, in the fifth embodiment of the anode layer 111A activation process, the introduced oxygen-containing gas OG is scavenged from the anode layer 111A using inert gas. For example, nitrogen gas can be used as the inert gas.

In the case of this configuration, since a tank, or the like, for storing the inert gas is required, it is suitable to carry out the anode layer 111A activation process in a facility, such as a factory. The introduced oxygen-containing gas OG can be scavenged from the anode layer 111A by providing a system for opening the anode layer 111A to the atmosphere and a valve that is attached to the system. This configuration can be applied to the SOFC 210 mounted on an automobile.

As shown in FIG. 14, when time t (OG) for introducing the oxygen-containing gas OG elapses (t=t2 in FIG. 14), the second valve 272 of the oxidation processing unit closes to stop the introduction of the oxygen-containing gas OG into the anode layer 111A.

Subsequently, the inert gas is introduced into the anode layer 111A to scavenge the introduced oxygen-containing gas OG from the anode layer 111A.

When scavenging by introducing the inert gas elapses (t=t6 in FIG. 14), the introduction of the inert gas is stopped.

The first valve 271 of the fuel introduction unit opens to introduce the hydrogen-containing gas HG into the anode layer 111A (Step S16). When the time t (HG) for introducing the hydrogen-containing gas HG elapses (t=t3 in FIG. 14), the stack temperature Ts is lowered to the operating temperature Td, and the SOFC 210 is operated normally.

It is preferable to scavenge the introduced oxygen-containing gas OG from the anode layer 111A before introducing the hydrogen-containing gas HG. By inserting a scavenging process between the introduction of the oxygen-containing gas OG and the introduction of the hydrogen-containing gas HG, it is possible to prevent the opportunity for the oxygen and the hydrogen to react directly, and to suppress reactions (heat generation) that are not necessary for the activation of the anode layer 111A. Accordingly, in order to safely and reliably cause the reactions necessary for activation, it is preferable to scavenge the introduced oxygen-containing gas OG from the anode layer 111A before introducing the hydrogen-containing gas HG.

As a measure to achieve the foregoing, it is preferable to scavenge the introduced oxygen-containing gas OG from the anode layer 111A using the inert gas. By employing a scavenging process that uses the inert gas, it becomes possible to more safely and reliably cause the reactions necessary for activation.

Other Modifications

The oxygen-containing gas OG may be a gas containing oxygen obtained by means of a water dissociation reaction in a gas containing water. Even in cases in which air cannot be introduced into the anode layer 111A, the oxygen-containing gas OG can be introduced into the anode layer 111A by supplying the gas containing water. Examples of water in the gas containing water include water in a fuel gas containing water, such as ethanol mixed water, and water generated by means of a fuel cell reaction.

In the same manner as the case in which air is used as the oxygen-containing gas OG, it is thereby possible to execute the anode layer 111A activation process and the performance improvement process of the SOFC 210 without adding an extra system. Moreover, the performance improvement process of the SOFC 210 can be executed using the simple fuel cell system 200 mounted on the automobile. Additionally, it is also possible to immediately execute the activation process when the performance improvement process of the SOFC 210 becomes necessary.

The fuel cell system 200 shown in FIG. 6 includes the second valve 272 in order to introduce, into the anode layer 111A, the oxygen-containing gas OG supplied to the cathode layer 111C. The configuration for introducing the oxygen-containing gas OG into the anode layer 111A is not limited to this configuration. For example, exhaust gas can be used as the supply source of the oxygen-containing gas OG. Additionally, it is possible to provide a system for opening the anode layer 111A to the atmosphere and a valve that is attached to said system, to thereby open the anode layer 111A to the atmosphere and replace the inside of the anode layer 111A with the atmosphere (air).

The invention claimed is:

1. An anode layer activation method in a solid oxide fuel cell, the anode layer activation method comprising:
   providing an anode layer containing nickel metal;
   stacking the anode layer, an electrolyte layer and a cathode layer on a metal support part to form a metal support cell, the metal support part being formed of a porous metal and interposed between the anode layer and a flow passage portion through which an anode gas flows such that an entirety of the metal support part is provided between the anode layer and the flow passage portion, the porous metal being made of a corrosion resistant metal material;

introducing an oxygen-containing gas into the anode layer by flowing the oxygen-containing gas in the flow passage portion to oxidize the nickel metal, the anode layer containing an unconnected network of nickel when the oxygen-containing gas is introduced, and introducing a hydrogen-containing gas into the anode layer to reduce the nickel that was oxidized and to connect the unconnected network of nickel and thereby increase a number of conduction paths in the anode layer that electrically connect the electrolyte layer to the metal support part, the flow passage portion, the metal support part, and the anode layer being sequentially stacked such that the flow passage portion and the anode layer are in contact with opposite surfaces of the metal support part.

2. The anode layer activation method according to claim 1, wherein
introduction of the oxygen-containing gas and the hydrogen-containing gas is executed at a temperature within a range of 400° C. to 850° C.

3. The anode layer activation method according to claim 1, wherein
introduction of the oxygen-containing gas and the hydrogen-containing gas is executed at a temperature that is higher than an operating temperature of the solid oxide fuel cell.

4. The anode layer activation method according to claim 1, wherein
the introduction temperature of the hydrogen-containing gas is lower than the introduction temperature of the oxygen-containing gas.

5. The anode layer activation method according to 4 claim 1, wherein
the solid oxide fuel cell includes a constituent member containing a binder, and
burning and oxidizing the binder of the constituent member when oxidizing the nickel.

6. The anode layer activation method according to claim 1, wherein
the oxygen-containing gas is air.

7. The anode layer activation method according to claim 1, wherein
the oxygen-containing gas is a gas containing oxygen obtained by a water dissociation reaction in a gas containing water.

8. The anode layer activation method according to claim 1, wherein
introduction times of the oxygen-containing gas and the hydrogen-containing gas are each 2 hours or more.

9. The anode layer activation method according to claim 1, wherein
the oxygen-containing gas to be introduced is scavenged from the anode layer before introducing the hydrogen-containing gas.

10. The anode layer activation method according to claim 9, wherein
the oxygen-containing gas to be introduced is scavenged from the anode layer using an inert gas.

11. The anode layer activation method according to claim 1, wherein
respective potentials of the anode layer at a time of oxidation and a time of reduction are natural potentials.

12. The anode layer activation method according to claim 1, wherein
oxidation and reduction of the anode layer are only carried out once per one switching to introduction of the hydrogen-containing gas after introduction of the oxygen-containing gas.

13. A solid oxide fuel cell system comprising:
a solid oxide fuel cell having a metal support cell, the metal support cell comprising an anode layer containing nickel metal, an electrolyte layer and a cathode layer stacked on a metal support part, the metal support part being formed of a porous metal and interposed between the anode layer and a flow passage portion through which an anode gas flows such that an entirety of the metal support part is provided between the anode layer and the flow passage portion, the porous metal being made of a corrosion resistant metal material, a fuel introduction unit that introduces a hydrogen-containing gas into the anode layer, an oxidation processing unit that introduces an oxygen-containing gas into the anode layer, the oxidation processing unit being configured to introduce the oxygen-containing gas into the anode layer by flowing the oxygen-containing gas in the flow passage portion, and a control unit that controls operations of the fuel introduction unit and the oxidation processing unit, when activating the anode layer, the control unit being configured to operate the oxidation processing unit to introduce the oxygen-containing gas into the anode layer to oxidize the nickel metal, the anode layer containing an unconnected network of nickel when the oxygen-containing gas is introduced, and being configured to operate the fuel introduction unit to introduce the hydrogen-containing gas into the anode layer to reduce the nickel that was oxidized to thereby increase a number of conduction paths formed by reduction of the nickel that electrically connect the electrolyte layer to the metal support part in the anode layer, and the flow passage portion, the metal support part, and the anode layer being sequentially stacked such that the flow passage portion and the anode layer are in contact with opposite surfaces of the metal support part.

14. A solid oxide fuel cell comprising:
a metal support cell having an anode layer containing nickel metal, an electrolyte layer and a cathode layer stacked on a metal support part, the metal support part being formed of a porous metal and interposed between the anode layer and a flow passage portion through which an anode gas flows such that an entirety of the metal support part is provided between the anode layer and the flow passage portion, the porous metal being made of a corrosion resistant metal material, the anode layer having three-phase boundaries defined by the nickel metal, electrolytes and pores, the anode layer including conduction paths of the nickel that connect the electrolyte layer to the metal support part, the conduction paths of the nickel being thinner than conduction paths formed by oxidization of the nickel, and the conduction paths of the nickel extending throughout the anode layer to a surface of the electrolyte to connect the electrolyte layer to the metal support part, and the flow passage portion, the metal support part, and the anode layer being sequentially stacked such that the flow passage portion and the anode layer are in contact with opposite surfaces of the metal support part.

15. The solid oxide fuel cell according to claim 14, wherein
the conduction paths of the nickel in the anode layer are formed by oxidizing and reducing the nickel.

16. The solid oxide fuel cell according to claim 15, wherein
the conduction paths formed by oxidizing the nickel are formed by introducing an oxygen-containing gas into the anode layer to connect the nickel.

17. The solid oxide fuel cell according to claim 15, wherein
the conduction paths formed by the nickel are formed by introducing a hydrogen-containing gas into the anode layer to reduce a number of conduction paths formed by the oxidization of the nickel.

18. The solid oxide fuel cell according to claim 16, wherein
the conduction paths formed by the nickel are formed by introducing a hydrogen-containing gas into the anode layer to reduce a number of conduction paths formed by the oxidization of the nickel.

19. The anode layer activation method according to claim 1, wherein
the oxygen-containing gas is introduced into the anode layer at a temperature greater than 650° C.

20. The solid oxide fuel cell system according to claim 13, wherein
the oxidation processing unit is configured to introduce the oxygen-containing gas into the anode layer at a temperature greater than 650° C.

21. The anode layer activation method according to claim 1, wherein
the corrosion resistant metal material includes at least one of an alloy containing nickel and chromium, corrosion resistant steel, and stainless steel.

22. The anode layer activation method according to claim 1, wherein
the stacking further includes providing a separator on an opposite side of the metal support part as the anode layer, an electrolyte layer and a cathode layer such that the metal support part is sandwiched between the anode layer and the separator.

23. The anode layer activation method according to claim 1, wherein
the flow passage portion is defined by the separator and the metal support part such that the anode gas passes through the metal support part to reach the anode layer.

* * * * *